US012773361B2

(12) United States Patent
Mies et al.

(10) Patent No.: US 12,773,361 B2
(45) Date of Patent: Oct. 27, 2026

(54) MOBILITY-ASSISTIVE GARMENT

(71) Applicant: Encore Innovation Group LLC, Livonia, MI (US)

(72) Inventors: Michael James Mies, Plymouth, MI (US); Waldemar Tadeusz Raczkowski, Farmington Hills, MI (US); Wiliam Francis Hayden, Dearborn Heights, MI (US)

(73) Assignee: Encore Innovation Group LLC, Livonia, MI (US)

( * ) Notice: Subject to any disclaimer, the term of this patent is extended or adjusted under 35 U.S.C. 154(b) by 214 days.

(21) Appl. No.: 18/275,661

(22) PCT Filed: Jan. 17, 2022

(86) PCT No.: PCT/US2022/012657
§ 371 (c)(1),
(2) Date: Aug. 3, 2023

(87) PCT Pub. No.: WO2022/169583
PCT Pub. Date: Aug. 11, 2022

(65) Prior Publication Data

US 2024/0091087 A1 Mar. 21, 2024

Related U.S. Application Data

(60) Provisional application No. 63/199,948, filed on Feb. 4, 2021.

(51) Int. Cl.
*A61G 7/10* (2006.01)
*A41D 13/00* (2006.01)
*A41D 13/12* (2006.01)

(52) U.S. Cl.
CPC ....... *A61G 7/1051* (2013.01); *A41D 13/0007* (2013.01); *A41D 13/1254* (2013.01)

(58) Field of Classification Search
CPC ................ A61G 7/1051; A61G 7/1023; A41D 13/0007; A41D 15/002; A62B 35/00; A41F 19/005; A47D 13/086; A63B 21/02
See application file for complete search history.

(56) References Cited

U.S. PATENT DOCUMENTS 560,683 A * 5/1896 Bruckner ............ A41D 15/002 D2/742
2,568,304 A * 9/1951 Schoenbrun ......... A47D 13/086 2/87

(Continued)

FOREIGN PATENT DOCUMENTS

JP 2001299814 A 10/2001
JP 2005013304 A 1/2005
JP 2006144140 A 6/2006

OTHER PUBLICATIONS

International Search Report and Written Opinion corresponding to application PCT/US2022/012657, dated Apr. 1, 2022, 11 pages.

*Primary Examiner* — Alissa L Hoey
(74) *Attorney, Agent, or Firm* — Reising Ethington P.C.

(57) ABSTRACT

An upper or lower body garment includes an interior surface, a strap sheath carried by the interior surface and establishing a strap tunnel, and a strap movably extending through the strap sheath and being slidable in the strap tunnel relative to the strap sheath. The strap may be stretch-resistant and composed of stretch-resistant nylon material, stretch-resistant polypropylene material, or stretch-resistant polyester material. The strap sheath may be sewn along a seam of a leg or a sleeve and may extend over a majority of a length of the leg or the sleeve. In the upper body garment, the strap may have a distal end including a hand coupling and a proximate end including a handle extending through the opening of the rear upper portion of the sleeve.

19 Claims, 6 Drawing Sheets

(56) References Cited

U.S. PATENT DOCUMENTS

| | | | | | |
|---|---|---|---|---|---|
| 2,607,340 | A * | 8/1952 | Anderson | A61F 15/00 | 601/34 |
| 3,739,772 | A * | 6/1973 | Ennis | A61F 13/041 | 602/4 |
| 4,495,941 | A * | 1/1985 | Rathvon | A61F 13/041 | 602/1 |
| 4,910,802 | A * | 3/1990 | Malloy | A63B 21/4009 | 2/69 |
| 5,014,692 | A * | 5/1991 | Rhoades | A61F 13/041 | 128/882 |
| 5,208,920 | A * | 5/1993 | Schaefer | A41D 15/002 | 2/93 |
| 5,256,119 | A * | 10/1993 | Tudor | A63B 23/04 | 128/882 |
| 5,308,305 | A * | 5/1994 | Romney | A63B 21/4021 | 482/121 |
| 5,367,709 | A * | 11/1994 | Teasley | A41B 13/08 | 2/69 |
| 5,369,804 | A * | 12/1994 | Metcalf | A41D 11/00 | 2/69 |
| 5,465,428 | A * | 11/1995 | Earl | A63B 21/0552 | 2/238 |
| 5,542,123 | A * | 8/1996 | DiPietro | A41D 11/00 | 2/69.5 |
| 5,778,452 | A * | 7/1998 | Dicker | A63B 21/00185 | 2/69 |
| 5,865,203 | A * | 2/1999 | Villano | A61H 3/00 | 135/65 |
| 5,911,696 | A * | 6/1999 | Coates | A61F 13/041 | 128/882 |
| 6,004,282 | A * | 12/1999 | Whitley | A61F 13/041 | 602/5 |
| 6,240,564 | B1 * | 6/2001 | Te Kanawa | A41D 13/0015 | 2/69 |
| 6,317,894 | B1 * | 11/2001 | Blechman | A41D 15/002 | 2/125 |
| 6,361,517 | B1 * | 3/2002 | Slinger | A61F 5/0113 | 482/79 |
| 6,428,495 | B1 * | 8/2002 | Lynott | A61F 5/3715 | 602/23 |
| 6,875,135 | B2 * | 4/2005 | Tracy, Sr. | A63B 69/0062 | 473/422 |
| 7,007,705 | B1 * | 3/2006 | Thrower | A61H 3/00 | 135/65 |
| 7,334,275 | B1 * | 2/2008 | Kirkwood | A61F 5/3715 | 5/81.1 R |
| 7,841,020 | B2 * | 11/2010 | Mayfield | A41D 13/02 | 2/232 |
| 7,971,272 | B2 * | 7/2011 | Bailey | A41D 15/002 | 2/269 |
| 8,002,082 | B2 * | 8/2011 | Snedeker | A62B 35/0006 | 2/69 |
| 8,250,685 | B1 * | 8/2012 | Kocet | A61G 7/1051 | 5/89.1 |
| 8,522,364 | B2 * | 9/2013 | O'Brien | A41D 13/1254 | 2/227 |
| 8,544,114 | B2 * | 10/2013 | Williams | A41D 13/0015 | 482/121 |
| 8,641,652 | B2 * | 2/2014 | Gazayerli | A61H 1/0292 | 602/32 |
| 8,656,516 | B1 * | 2/2014 | Reinhardt Rawlings | A41D 11/00 | 2/69 |
| 9,162,100 | B2 * | 10/2015 | Rasnake | A63B 23/1209 | |
| 9,327,156 | B2 * | 5/2016 | von Hoffmann | A63B 21/02 | |
| 9,370,211 | B2 * | 6/2016 | Yee | A41D 27/208 | |
| 9,415,254 | B2 * | 8/2016 | Dyer | A63B 21/0442 | |
| 9,433,814 | B2 * | 9/2016 | von Hoffmann | A63B 21/4011 | |
| 9,578,909 | B2 * | 2/2017 | Daniels | A41D 27/20 | |
| 9,687,033 | B2 * | 6/2017 | Lillie | A41D 1/06 | |
| 9,714,074 | B2 * | 7/2017 | Luomala | B63C 11/04 | |
| 9,757,286 | B2 * | 9/2017 | Beaulieu | A61G 1/044 | |
| 9,782,026 | B2 * | 10/2017 | Cohan | A41C 1/10 | |
| 9,855,161 | B1 * | 1/2018 | Bonaroti | A61F 5/0111 | |
| 9,932,208 | B2 * | 4/2018 | Mealy | A45F 3/14 | |
| 10,051,907 | B2 * | 8/2018 | Dammann | A42B 1/12 | |
| 10,143,878 | B2 * | 12/2018 | Gottfried | A63B 21/4025 | |
| 10,179,061 | B2 * | 1/2019 | Wiemann | A61F 5/0113 | |
| 10,349,688 | B2 * | 7/2019 | Forko | A41D 13/0015 | |
| 10,517,785 | B2 | 12/2019 | Petterson et al. | | |
| 10,660,374 | B2 * | 5/2020 | Glaude | A41B 9/14 | |
| 10,667,974 | B2 * | 6/2020 | Wright | A61G 7/1023 | |
| 10,857,414 | B1 | 12/2020 | Lopez | | |
| 10,925,786 | B2 * | 2/2021 | Ueda | A61G 5/127 | |
| 11,173,090 | B2 * | 11/2021 | Dellacqua | A61F 5/02 | |
| 11,369,507 | B2 * | 6/2022 | Frappier | A61F 5/0585 | |
| 11,375,760 | B2 * | 7/2022 | Rutten | A62B 35/0025 | |
| 11,998,065 | B2 * | 6/2024 | Gladney | A41F 9/025 | |
| 12,029,696 | B2 * | 7/2024 | Candela | A61G 7/1038 | |
| 12,134,448 | B2 * | 11/2024 | Hornbaker | A41D 13/0125 | |
| 12,245,645 | B2 * | 3/2025 | Wong | A41D 15/002 | |
| 2003/0213510 | A1 * | 11/2003 | MacCready | A61H 3/00 | 135/65 |
| 2007/0129657 | A1 * | 6/2007 | Fisher | A61F 5/3738 | 602/4 |
| 2011/0030118 | A1 * | 2/2011 | Pratchett | A62B 35/0025 | 2/243.1 |
| 2013/0067628 | A1 * | 3/2013 | Harb | A63B 21/00061 | 2/69 |
| 2013/0318680 | A1 | 12/2013 | Keathley | | |
| 2014/0207040 | A1 * | 7/2014 | Ingimundarson | A61F 5/0193 | 602/23 |
| 2015/0283006 | A1 * | 10/2015 | Akins | A61G 1/044 | 5/628 |
| 2015/0351992 | A1 * | 12/2015 | Crowley | A61H 1/0237 | 601/34 |
| 2016/0270456 | A1 * | 9/2016 | Mulindwa | A41D 13/0007 | |
| 2016/0278454 | A1 * | 9/2016 | Lucas | A41D 13/0007 | |
| 2016/0317853 | A1 | 11/2016 | Benocci | | |
| 2017/0181910 | A1 | 6/2017 | Petterson et al. | | |
| 2018/0070658 | A1 * | 3/2018 | Rudick | A41F 9/025 | |
| 2020/0085123 | A1 | 3/2020 | Achtymichuk et al. | | |
| 2021/0401650 | A1 * | 12/2021 | Thompson | A41F 9/005 | |
| 2022/0080247 | A1 * | 3/2022 | Carreras | A63B 21/4043 | |
| 2023/0248603 | A1 * | 8/2023 | Norris | A41D 13/0007 | 128/845 |
| 2025/0234982 | A1 * | 7/2025 | Davis | A45F 3/04 | |

* cited by examiner

MOBILITY-ASSISTIVE GARMENT

TECHNICAL FIELD

This disclosure relates generally to wearing apparel and, more particularly, to a medical device garment for assisting a wearer with mobility.

BACKGROUND

Typically, when a paralyzed individual with limited lower body mobility wishes to reposition their lower appendages, they must use a specialized piece of equipment such as a foot lifter. These devices are usually bulky and not easily carriable by the user. Additionally, such appendage repositioning aids are costly, complicated, cumbersome, and unsightly in that they do not blend with the everyday clothing an individual may wear. Moreover, it is not uncommon for a paralyzed individual to require multiple transfers during a day. A transfer typically involves an individual repositioning their lower appendages from a first position to a second position, then pivoting their entire body to the desired second position. When an individual is in a hospital or care facility, assistants are sometimes required to assist with transfers. In such instances, the assistant may be required to intrusively place an assistive device around the appendage of a paralyzed individual. When no assistive device is available, the assistant or paralyzed individual may be required to grasp a piece of clothing or their appendage directly in order to reposition. This can result in discomfort or injury to the individual.

SUMMARY

In an embodiment of the present disclosure, a garment includes an interior surface, a strap sheath carried by the interior surface and establishing a strap tunnel, a strap movably extending through the strap sheath and being slidable in the strap tunnel relative to the strap sheath. Lower and upper body versions of the garment are also disclosed.

In another embodiment of the present disclosure, a method of repositioning an appendage of a wearer of a garment is disclosed. The method includes: coupling an appendage of the wearer to an appendage coupling of a slidable strap of a garment worn by the wearer; pulling on a handle of the slidable strap of the garment, so as to lift the wearer's appendage and slide the slidable strap inside of a strap tunnel established by a sheath coupled to an interior surface of an appendage tunnel of the garment and extending along the appendage tunnel; swinging an appendage of the wearer of the garment from a first position to a second position, while carrying out the pulling step; and releasing the slidable strap once the appendage has been swung to the second position.

DETAILED DESCRIPTION

In general, a mobility-assistive garment will be described using one or more examples of illustrative embodiments of a garment with an assistive mobility feature. In one example, the garment includes a strap having a handle and an appendage coupling for lifting and moving an appendage. In another example, the garment includes a torso strap. The example embodiment(s) will be described with reference to pants and a sweatshirt for use by a paralyzed individual. However, it will be appreciated as the description proceeds that the disclosed subject matter is useful in many different applications and may be implemented in many other embodiments. In any case, the presently disclosed mobility-assistive garment may be considered a medical device, essential for providing professional care to a wearer in an effective and dignified manner.

Figure 1:
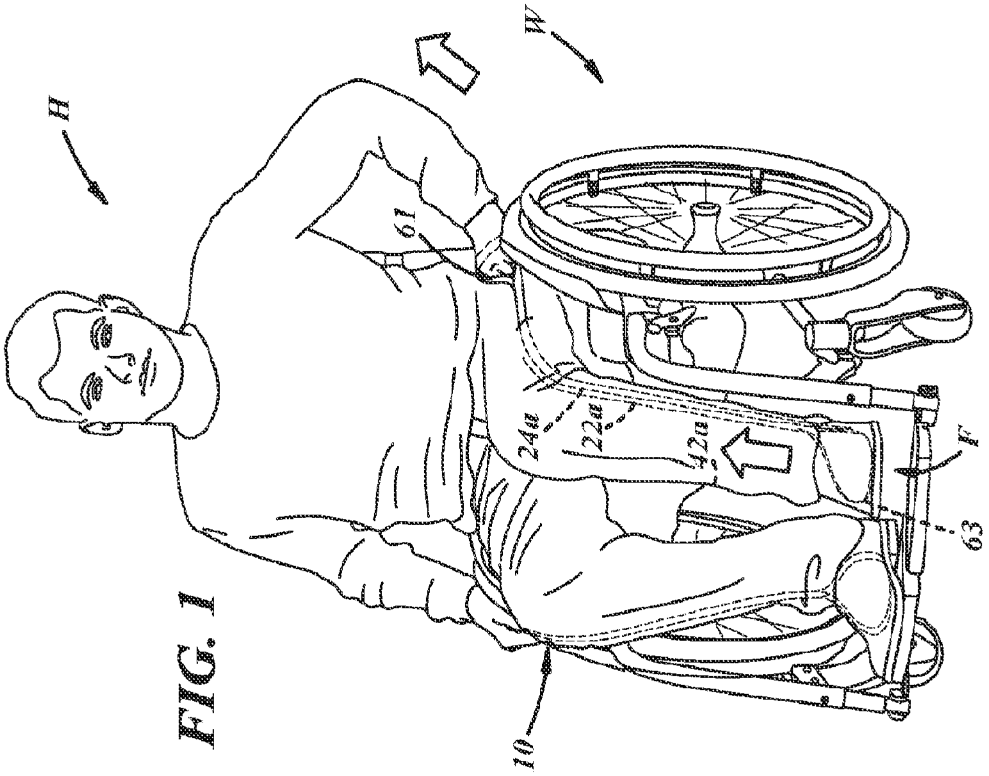
FIG. 1 is a front perspective view showing an illustrative embodiment of a mobility-assistive garment, in the form of pants, worn by a wearer in a wheelchair.

Referring specifically to the drawings, FIG. 1 shows a human wearer H of clothing sitting in a wheelchair W and wearing an article of clothing or a garment according to an illustrative embodiment of the present disclosure. The wearer H is depicted using the garment 10 to lift the wearer's foot F as will be described in greater detail below.

Figure 2:
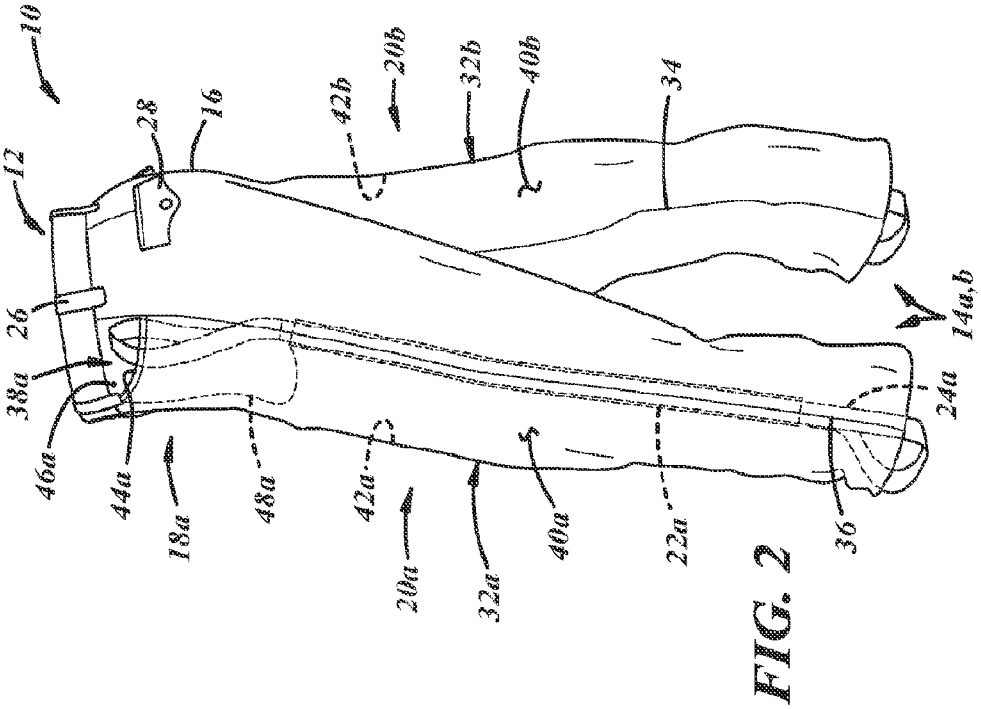
FIG. 2 is a side view of the garment of FIG. 1, showing a portion of a strap of the garment in an exposed position.
Figure 3A:
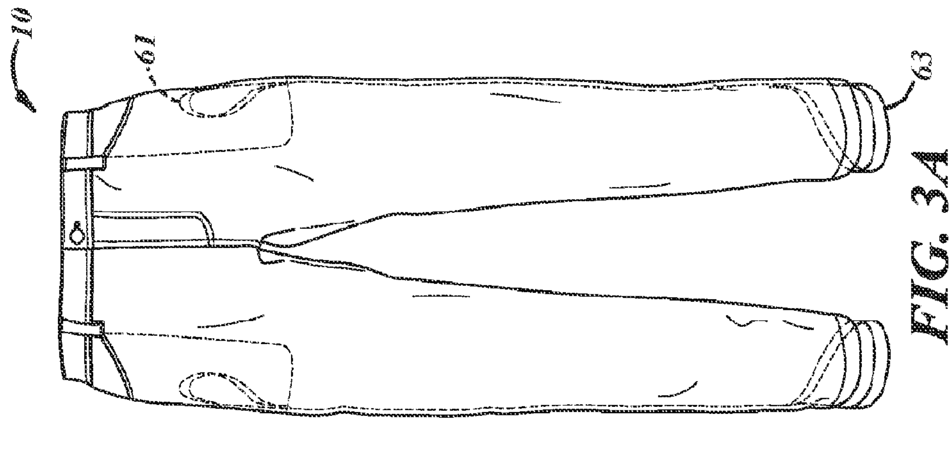
FIG. 3A is a front view of the garment showing the strap in the stored position.
Figure 3:
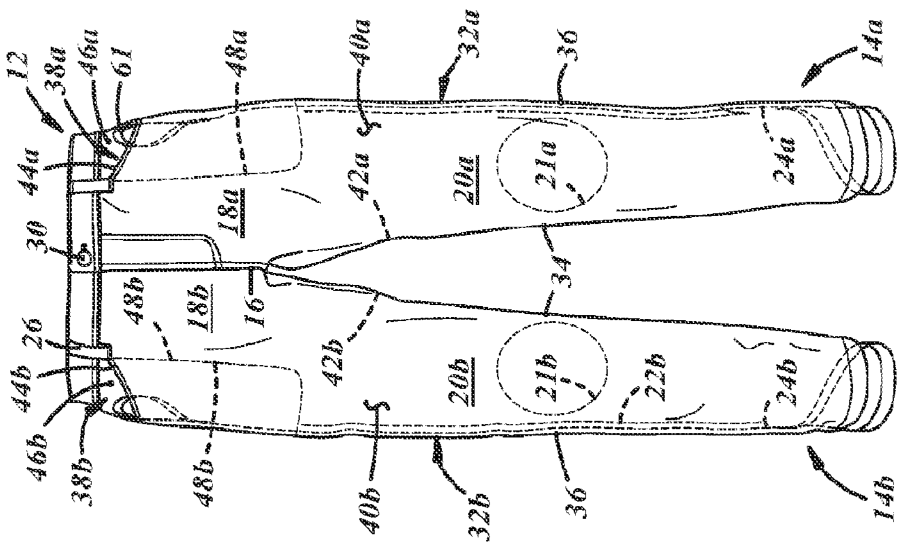
FIG. 3 is a front view of the garment showing the portion of the strap in the exposed position.

With reference to FIGS. 2 and 3, the illustrative garment 10 is a lower body garment and may include a waist band 12 to receive a user's waist, pant legs or legs 14*a,b* extending from the waist band 12, connected by a crotch seam 16 extending along a direction from a front of the waist band 12 toward a rear of the waist band 12. The legs 14*a,b* include upper portions 18*a,b* to receive a lower portion of the wearer's torso and lower portions 20*a,b* extending away from the upper portions 18*a,b* to receive the wearer's legs. The garment 10 also includes strap sheaths 22*a,b* carried by the legs 14*a,b*, and straps 24*a,b* movably extending through the strap sheaths 22*a,b*. The garment 10 also may include belt loops 26, rear pockets 28, buttons 30, and/or any other garment accessories.

In general, the garment 10 may be made of a fabric, other woven material, or any material whatsoever that is suitable for use as a garment for a human. A suitable fabric may include one that is resistant to tearing or stretching during use. For example, garment may be made of a strong heavy fabric, such as, for example, rip-stop nylon, polyester, or the like. Another suitable fabric may include cotton. A blended fabric may also be used such as, for example, a cotton-polyester blend. For example, a cotton-polyester blend having at least 2% polyester by weight may be used. Fabrication from a cotton-polyester blend may enhance the comfort when worn. A cotton-polyester blend may also be more resilient during use than pure cotton. A cotton-polyester blend may also be machine washable and/or suitable for machine drying.

Also, in the illustrated embodiment, the garment 10 may be outerwear including pants. As used herein, the term "pants" includes trousers, breeches, slacks, knickerbockers, britches, dungarees, jeans, knickers, pantaloons, sweatpants, or the like or any other leg covering garment that includes leg tunnels configured to extend beyond a wearer's knees. In other embodiments, a garment according to the present disclosure may include an upper torso garment, for example, a sweatshirt, sweater, shirt, coat, jacket, suitcoat, sport coat, or the like, or any other such garment that includes arm tunnels.

With reference to FIGS. 2 and 3, the lower portions 20*a,b* of the legs 14*a,b* include appendage or leg tunnels 32*a,b* for receiving a wearer's legs, inner and outer seams 34, 36, and front pockets 38*a,b*. The leg tunnels 32*a,b* surround the wearer's appendages and include exterior surfaces 40*a,b* and interior surfaces 42*a,b*. The leg tunnels 32*a,b* may also include the seams 34, 36 that extend longitudinally along the length of the legs 32*a,b* and may extend to the waist band 12. In the illustrated embodiment, the pockets 38*a,b* are located near proximate ends of the legs 32*a,b*. However, in other embodiments, the pockets 38*a,b* may be located anywhere along the legs 32*a,b*. As used herein, the terminology "proximate" means closer to one end than another, opposite end.

With continued reference to FIGS. 2 and 3, the pockets 38*a,b* may be formed as traditional style pants pockets in which a wearer stores objects or places the wearer's hands. In the illustrated embodiment, the pockets 38*a,b* may be established by upper edges 44*a,b* of the upper portions 18*a,b* of the legs 14*a,b*, external panels 46*a,b* extending down from the waist band 12, and by internal panels 48*a,b* attached to the external panels 46*a,b* and to inside surfaces at the upper edges 44*a,b*. In other embodiments, the pockets 38*a,b* may be established by separate pouches sewn or otherwise coupled to the legs 14*a,b*, or any other pocket configurations suitable for use with pants.

Figure 4:
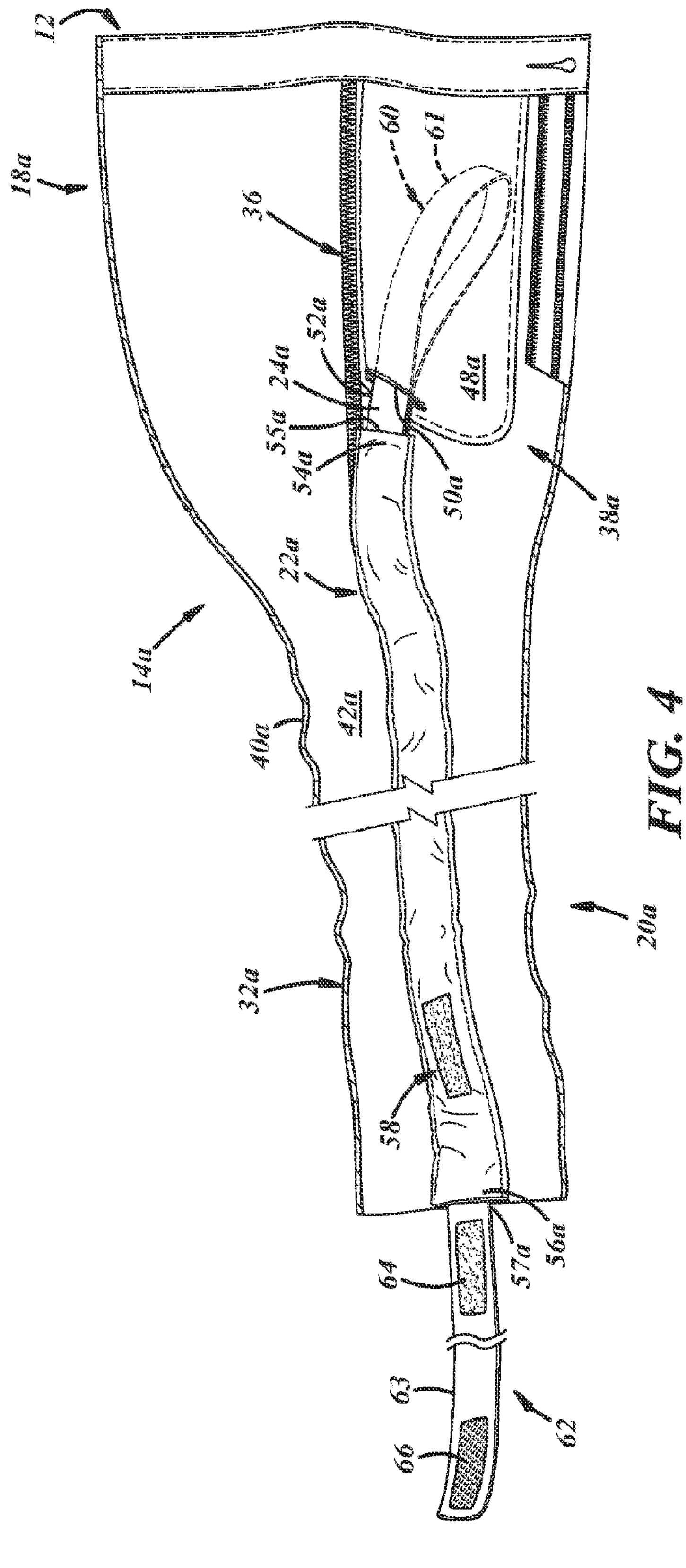
FIG. 4 is a fragmentary, longitudinal cross-sectional view showing a structural relationship of the garment, between the strap, a strap sheath, and a pant pocket.

With reference to FIG. 4, the garment 10 is shown in fragmentary longitudinal cross section. As the description proceeds below, reference will be made with respect to the left leg 14*a* and/or portions thereof. The garment 10 includes a strap opening 50*a* of the pocket 38*a* to allow a portion of the strap 24*a* to pass therethrough. The opening 50*a* is appropriately sized to allow the strap 24*a* to pass through and may include a slit, a hole, a gap between an edge of pant pocket material and pant appendage material, and the like. As illustrated, the opening 50*a* is a slit in the internal panel 48*a* proximate a lower edge 52*a* of the pocket 38*a*, thereby providing a connection between the interior of the pocket 38*a* and the interior of the leg tunnel 32*a*. The interior of the leg tunnel 32*a* is established by the interior surface 42*a* of the leg tunnel 32 which circumferentially extends around a longitudinal axis of the leg tunnel 32.

With continued reference to FIG. 4, the strap sheath 22*a* may be carried by the interior surface 42*a* of the leg tunnel 32*a*, and may be sewn or otherwise attached to the interior surface 42*a* along the outer seam 36 of the leg 14*a* to not only create an aesthetically uniform look but also increase overall strength of the outer seam 36. More specifically, the strap sheath 22*a* may straddle the outer seam 36 within the interior of the leg tunnel 32*a*. The strap sheath 22*a* may be made from a material that is durable and resistant to abrasion, for example, a nylon material.

The strap sheath 22*a* comprises a first or upper end 54*a*, a second or lower end 56*a*, and establishes a strap tunnel between the first and second ends 54*a*, 56*a* for carrying the strap 24*a*. In one embodiment, the sheath 22*a* may include a circumferentially continuous or tubular component having an outer side coupled to the interior surface 42*a* of the leg tunnel 32*a*, for instance, sewn to the outer seam 36 of the leg 14*a* within the leg tunnel 32*a*. Accordingly, the sheath 22*a* may be sewn along, to, and over the outer seam 36 within the interior of the leg tunnel 32*a*. In another embodiment, the sheath 22*a* may include a planar component having laterally opposite edges coupled to the interior surface 42*a* of the leg tunnel 32*a*, for example, sewn to the outer seam 36 of the leg 14*a* within the leg tunnel 32*a*. At the upper end 54*a*, the strap sheath 22*a* includes an upper opening 55*a* for receiving the strap 24*a*, wherein the upper opening 55*a* may be located beneath the opening 50*a* of the pocket 38*a*. At the lower end 56*a*, the sheath 22*a* includes a lower opening 57*a* that may be located above the bottom of the leg tunnel 32*a* of the leg 14*a*, for example, at or above a hem thereof. A strap fastener 58 may be provided on the sheath 22*a* proximate the lower opening 57*a*, for example, within ten inches thereof. The fastener 58 may be part of a hook and loop fastener or variations thereof (Dual-Lock, mushroom stems, etc.), a button, or a button hole, magnet, or any other suitable fastener.

The sheath 22*a* may carry the strap 24*a* along a majority (greater than 50%) of the length of the leg tunnel 32*a* of the leg 14*a*. Accordingly, the sheath 22*a* may extend along a majority of the length of the leg tunnel 32*a*. More specifically, the sheath 22*a* may extend from a location below a knee portion (see, e.g., FIG. 3; 21*a,b*) of the leg 14*a* to a location above the knee portion. The knee portion is that portion of the leg 14*a* that corresponds to the location of a wearer's knee when the wearer is wearing the garment 10. Even more specifically, the sheath 22 may extend from a location within zero to three inches (including all ranges, sub-ranges, and values within that range) of the distal end of the leg 14*a* to a location above the knee portion of the leg 14*a* and, more particularly, to a location within zero to three inches (including all ranges, sub-ranges, and values within that range) of the pocket 38*a*.

Figure 2A:
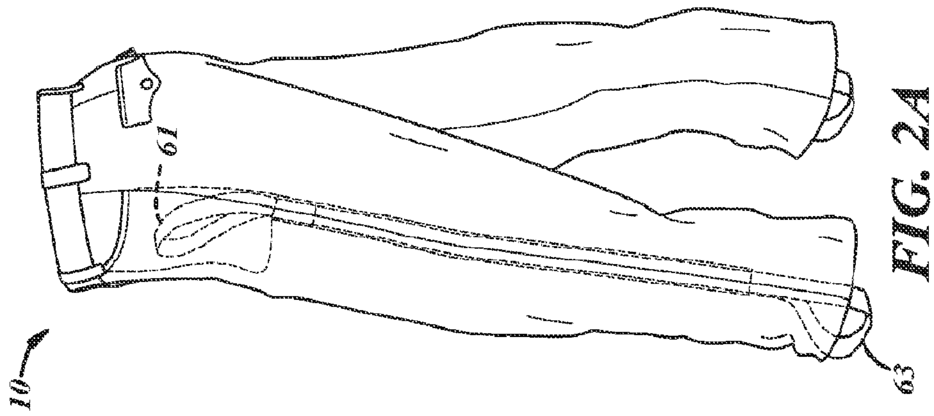
FIG. 2A is side view of the garment showing the strap in a stored position.

With continued reference to FIG. 4, in the illustrated embodiment, the strap 24*a* includes a proximate end 60 that may be configured to extend into the pocket 38*a* and a distal end 62 that may be configured to extend out of the distal end of the leg tunnel 32*a*. The proximate end 60 of the strap 24*a* may include a grip or handle 61 to be gripped by a hand of the wearer or an assistant. In the illustrated embodiment, the handle 61 is formed as a loop by stitching a portion of the strap 24*a* to itself but, in other embodiments, the handle 61 may be formed by other means, such as, for example, a straight end of the strap 24*a* or a separate handle of any suitable shape sewn, tied, adhered, or otherwise coupled to the strap 24*a*. When not in use, the handle 61 may be stored within the pocket 38*a*, thereby creating an aesthetically uniform look to the garment 10, as shown in FIGS. 2A and 3A. When the wearer desires to use the handle 61, it may be retrieved from the pocket 38*a* and pulled out as shown in FIGS. 2 and 3.

The distal end 62 of the strap 24*a* may include a foot coupling 63 for receiving a wearer's foot. As used herein, the term "foot" includes a wearer's bare foot, sock-covered foot, footwear-covered foot, and the like. The foot coupling 63 may be a foot loop for receiving a wearer's foot, or footwear integrated with the strap 24*a*, or any other coupling suitable for use in coupling a foot to the strap 24*a*. As illustrated, the foot coupling 63 is shown in an open state but may be closed into loop form by attaching a portion of the distal end 62 to itself, for example, via hook and loop fasteners or variations thereof (Dual-Lock, mushroom stems, etc.), a button, or a button hole, magnet, or any other suitable fastener. More specifically, the foot coupling 63 may be formed at the distal end of the strap by fastening a first strap fastener 64 to a second strap fastener 66. The fasteners 64, 66 may be coupled to the strap 24*a* in such a position relative to one another so as to create loop sized for a wearer's foot when the fasteners 64, 66 are fastened together. When the foot coupling 63 is not in use, one or both of the fasteners 64, 66 may be fastened to the strap fastener 58, which may be located on the sheath 22*a* or may be located on the interior surface 42*a* of the leg tunnel 32*a*, to thereby conceal the strap 24*a* within the leg tunnel 32*a*. In other embodiments, a foot coupling may be established by sewing a portion of the strap 24*a* onto itself, or by attaching a separate handle to the strap 24*a*.

With continued reference to FIG. 4, the strap 24*a* extends along the length of the leg tunnel 32*a* through the strap tunnel of the sheath 22*a* and extends a distance greater than the length of the sheath 22*a*. At the proximate end of the strap sheath 22*a*, the strap 24*a* exits from the upper opening and continues into the pocket 38*a* through the opening 50*a*. The handle 61 is therefore accessible by the wearer or an assistant. When a pulling force is applied to the handle 61, the strap 24*a* may freely slide through the strap tunnel established by the sheath 22*a* alone or by the sheath 22*a* and the leg 14*a*. The strap 24*a* is preferably fabricated from, for example, a heavy-duty nylon, a polypropylene, or any other durable flexible material that is resistant to tearing. Further, the strap 24*a* may be dimensioned so as to be usable for specific clothing sizes, i.e., a shorter strap for a size "small" piece of clothing, and the like. As previously noted, the garment 10 may be composed of fabric resistant to stretching. In such embodiments, the strap 24*a* may be stretch-resistant, for example, composed of stretch-resistant nylon material, stretch-resistant polypropylene material, or stretch-resistant polyester material.

Figure 6:
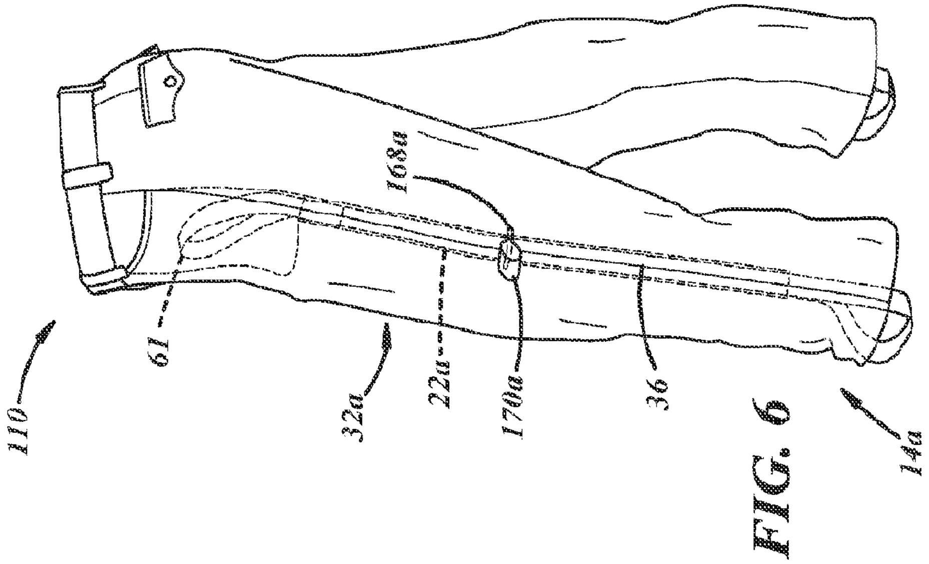
FIG. 6 is a side view according to the garment of FIG. 5.
Figure 5:
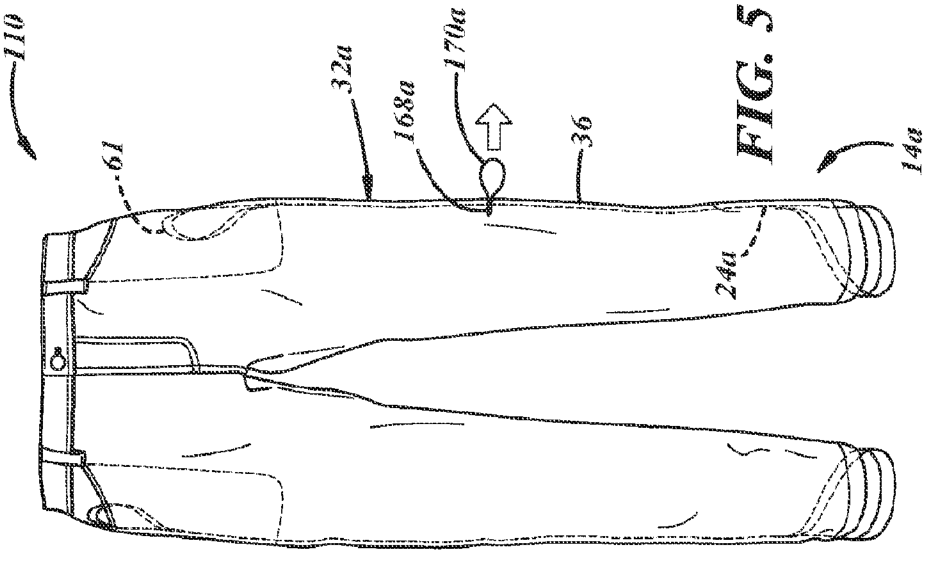
FIG. 5 is a front view according to another illustrative embodiment of a mobility-assistive garment.

FIGS. 5 and 6 show another illustrative embodiment of a garment 110 in which the strap 24*a* may protrude from a leg 14*a* nearer a knee portion of the leg 14*a*, as will be described in greater detail herein below. This embodiment is similar in many respects to the embodiment of FIGS. 1-4 and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

In this embodiment, the leg tunnel 32*a* of the leg 14*a* includes an opening 168*a* in a middle one-third of the length of the leg tunnel 32*a* in a location of the leg tunnel 132*a* proximate to a wearer's knee, to permit access to the strap 24*a*. The opening 168*a* may be in an outer side of the leg tunnel 32*a*, for example, traversing through the outer seam 36 as illustrated. The opening 168*a* may be a simple slit through the material of the leg tunnel 32*a*, or a hemmed opening like a button hole, or a small pocket, or any other suitable opening. In other embodiments, the opening 150*a* may be circumferentially spaced away from the seam 36, for example, adjacent to the outer seam 36 toward a front surface of the leg tunnel 32*a*. In any case, although not illustrated, a sheath opening corresponding to the leg tunnel opening 168*a* may be provided through the sheath 22*a* to permit access to the strap 24*a* therethrough. The strap 24*a* includes an intermediate handle 170*a* that may be created when a user reaches the user's fingers through the opening 168*a* and through the corresponding sheath opening and pulls a loop portion of the strap 24*a* therethrough and out of the leg 14*a* to create the intermediate handle 170*a*. In other embodiments, the strap 24*a* need not include the upper handle 61 and, instead, an upper portion of the strap 24*a* could be fixed to a portion of the garment 10, for instance, the leg 14*a*. In such embodiments, the intermediate handle 170*a* would serve as the only handle. Those of ordinary skill in the art would recognize that the features of this embodiment could be provided to one or the other of the legs 14*a,b* or to both.

Referring again to FIG. 1, also disclosed is method of repositioning an appendage of the wearer W of the garment 10. The method includes coupling an appendage F of the wearer W to an appendage coupling 63 of a slidable strap 24*a* of the garment 10 worn by the wearer W of the garment 10. The method also includes pulling on a handle 61, 170*a* of the slidable strap 24*a* so as to lift the wearer's appendage and slide the slidable strap 24*a* inside of a strap tunnel established by a sheath 22*a* coupled to an interior surface 42*a* of an appendage tunnel 32*a* of the garment 10 and extending along the appendage tunnel 32*a*. The method additionally includes swinging an appendage F of the wearer W of the garment 10 from a first position to a second position, while carrying out the pulling step. The method further includes releasing the slidable strap 24*a* once the appendage F has been swung to the second position. This method may be used by the individual wearing garment and/or by an individual assisting the wearer.

Figure 7:
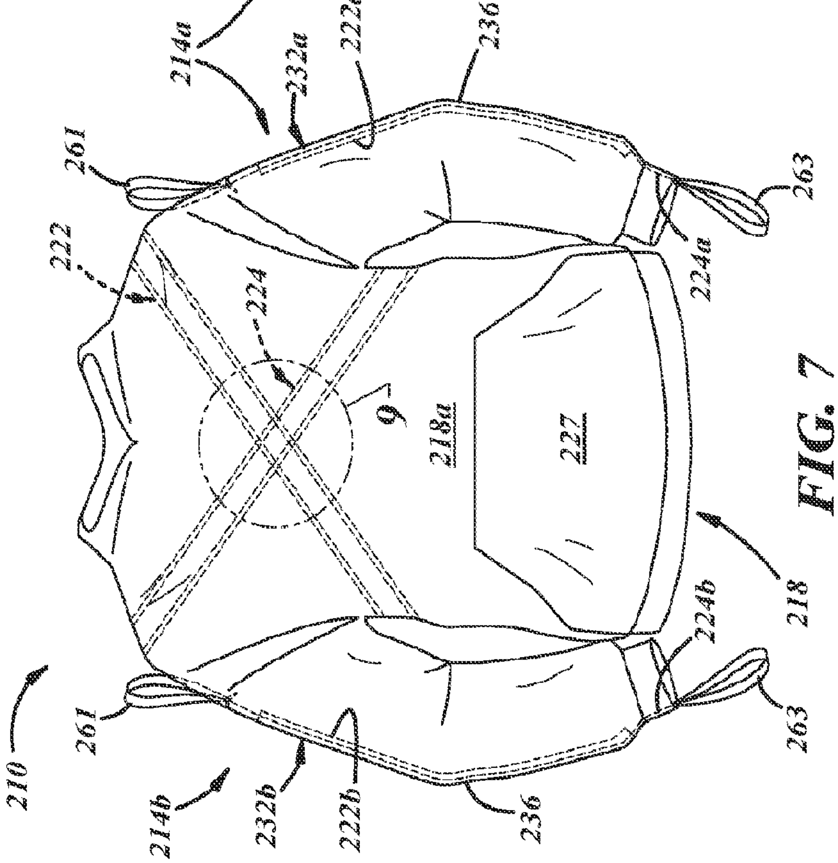
FIG. 7 is a front view according to an additional illustrative embodiment of a mobility-assistive garment.
Figure 8:
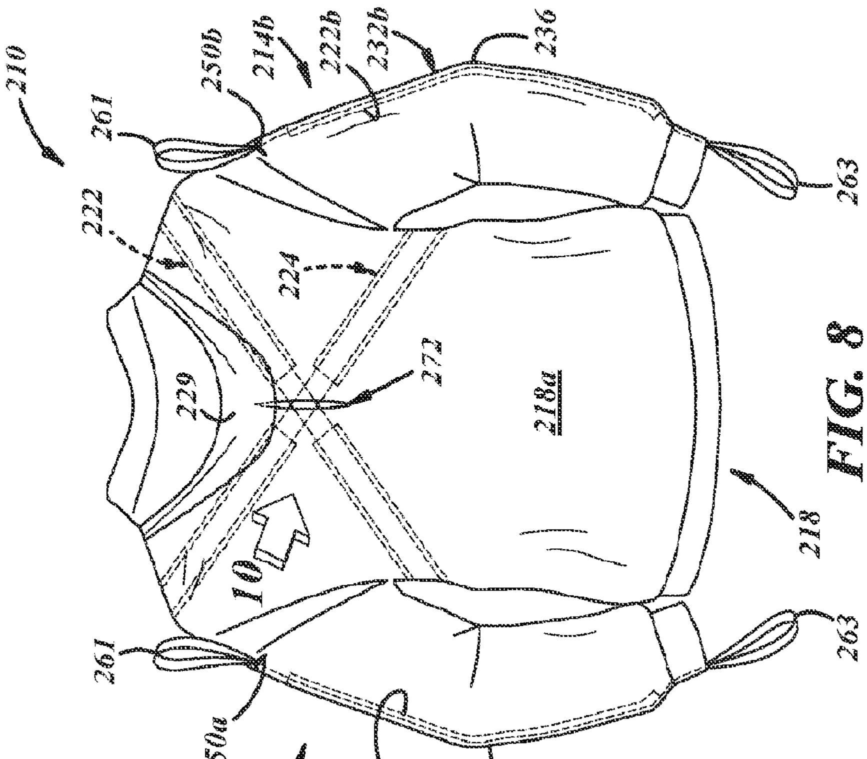
FIG. 8 is a rear view of the garment of FIG. 7.

FIGS. 7 and 8 show an additional illustrative embodiment of a garment 210 to assist a wearer with mobility, as will be described in greater detail herein below. This embodiment is similar in many respects to the embodiment of FIGS. 1-6 and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

In this illustrative embodiment, the garment 210 is an upper body garment and, more specifically, a sweatshirt. But, in other embodiments, the garment 210 could be a sweater, shirt, coat, jacket, suitcoat, sport coat, or the like, or any other upper body garment that includes arm tunnels. In the illustrated embodiment, the garment 210 may include a waist band 212 to receive a user's waist, a torso portion 218 to receive a user's torso and including a front torso portion 218*a* and a rear torso portion 218*b*, and sleeves 214*a,b* extending from the torso portion 218. The garment 210 also includes strap sheaths 222*a,b* carried by the sleeves 214*a,b*, and straps 224*a,b* movably extending through the strap sheaths 222*a,b*. The garment 210 also may include pockets 227, a hood 229, and/or any other garment accessories. Arm tunnels 232*a,b* may also include outer seams 236 that extend longitudinally along the length of the arm tunnels 232*a,b*.

With reference to FIG. 8, the garment 210 includes strap openings 250*a,b* to allow portions of the straps 224*a,b* to pass therethrough. The openings 250*a,b* are appropriately sized to allow the straps 224*a* to pass through and may include slits, holes, gaps between material portions, and/or the like. As illustrated, the openings 250*a,b* are slits in the arm tunnels 232*a,b* proximate a shoulder end of the arm tunnels 232*a,b*, and on a rearward facing surface of the arm tunnels 232*a,b*. Like the pants embodiments, and although not shown here, the garment 210 could include pockets in the region of the openings 250*a,b* to hide the handles 261 when not in use. Likewise, like the second pants embodiment, and although not shown here, the garment 210 could include intermediate handles and corresponding openings proximate an elbow portion of the sleeves 214*a,b* that corresponds to the location of a wearer's elbow when the wearer is wearing the garment 210. For example, such handles and openings could be provided in a middle one-third of the length of the sleeves 214*a,b*.

With reference to FIGS. 7 and 8, the garment 210 also may include assistive torso mobility features. For example, the garment 210 may include a strap 224 that may cross over the front torso portion 218*a* of the garment 210 as shown in FIG. 7 and the rear torso portion 218*b* of the garment 210 as shown in FIG. 8. In some embodiments, the strap 224 may be one continuous strap that crisscrosses over itself, is configured to extend in a FIG. 8 pattern over the torso, and that terminates in opposed ends that are sewn, tied, adhered, or otherwise coupled to one another. In the illustrated embodiment, the strap 224 may be constituted from two more separate strap portions that may be independently slidable or may be sewn, tied, adhered, or otherwise coupled to one another, for instance, at the rear torso portion 218*b* of the garment 210. In any case, the strap 224 preferably extends across/over shoulder portions of the garment 210 and across/under armpit portions of the garment 210, and preferably is carried in a sheath 222 that is sewn, adhered, or otherwise coupled to an inside surface of a torso portion of the garment 210. As illustrated, the sheath 222 may be constituted from two separate sheath portions having opposed ends at the rear torso portion 218*b*. In other embodiments, the sheath 222 may be one continuous sheath that crisscrosses over itself with suitable openings therein for the strap 224 to exit, or may be constituted from more than two separate sheath portions.

Figure 9:
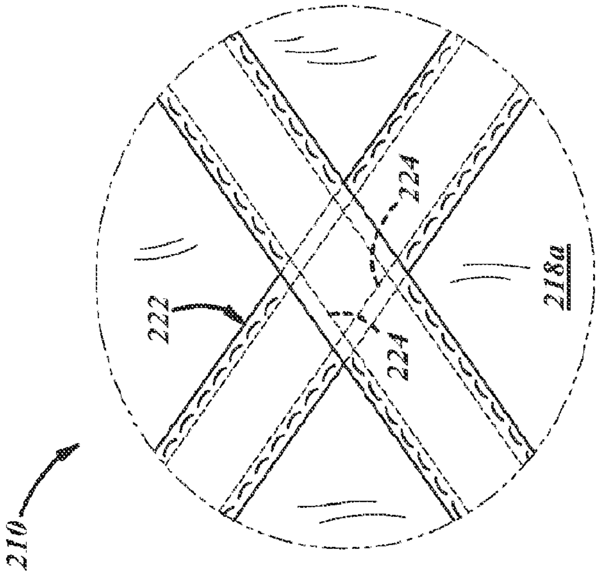
FIG. 9 is an internal view of an inside surface of the garment of FIG. 7, generally corresponding to circle 9 thereof.

With reference to FIG. 9, an underlying portion of the crisscrossed sheath 222 may be sewn, adhered, or otherwise coupled to an inside surface of front torso portion 218*a* of the garment 210 and, similarly, an overlying portion of the crisscrossed sheath 222 may be sewn, adhered, or otherwise coupled to the inside surface of the front torso portion 218*a* of the garment 210 but not to the underlying portion of the sheath 222. Accordingly, crisscrossed portions of the strap 224 carried in the sheath 222 may slide relative to one another within the sheath 222 in which the strap 224 is slidably carried. In other embodiments, the sheath 222 may be interrupted with spaced apart ends where the strap 224 crosses over itself at the rear torso portion 218*b* such that the strap 224 crisscrosses itself in direct contact with itself.

Figure 10A:
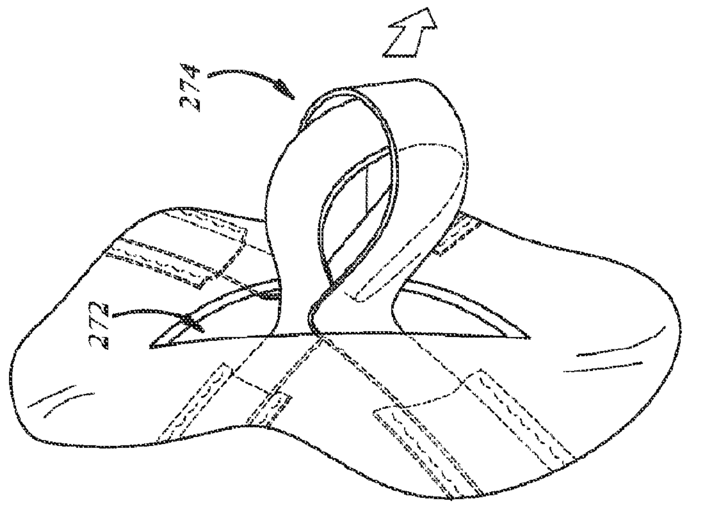
FIGS. 10 and 10A are fragmentary views of the garment of FIG. 8 corresponding to arrow 10 thereof.
Figure 10:
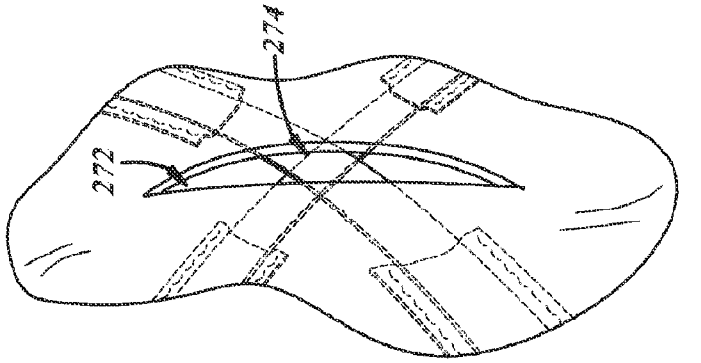

With reference to FIG. 10, a crisscrossed portion of the strap 224 may be accessed by hand via a vent, slit, or other opening 272 in a rear torso portion of the garment 210. In the illustrated embodiment, the opening 272 is a vertically oriented slit. But, in other embodiments, an opening could be horizontally oriented, obliquely oriented, equipped with a zipper, hook-and-loop fastener, button(s), snaps, or any other coupler suitable for use with clothing to close and open the opening. With reference to FIG. 10A, the crisscrossed portion of the strap 224 may be pulled out of the opening 272 by hand to establish a handle 274 of the strap 224 that may be used to constrict the strap 224 around the torso of the wearer of the garment 210 to assist with lifting or otherwise moving the wearer. The handle 274 may be constituted by both underlying and overlying portions of the strap 224 as illustrated. In other embodiments, the handle 274 may be constituted by only the overlying portion of the strap 224. In either case, pulling on the handle 274 slidably constricts the strap 224 around the torso of the wearer and facilitates assisting the wearer with mobility.

Prior approaches to use of assistive mobility devices involve complicated, costly, and cumbersome configurations. In contrast, the present disclosure provides a simpler, more economical, and streamlined configuration.

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not limitation. As used herein, the term "may" is an expedient merely to indicate optionality, for instance, of an element, feature, or other thing, and cannot be reasonably construed as rendering indefinite any disclosure herein. Other terms are to be interpreted and construed in the broadest reasonable manner in accordance with their ordinary and customary meaning in the art, unless the terms are used in a context that requires a different interpretation.

Finally, the present disclosure is not a definitive presentation of an invention claimed in this patent application, but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Features of various implementing embodiments may be combined to form further embodiments of the invention. Therefore, the claimed invention is not limited to the particular examples of illustrative embodiments disclosed herein but, instead, is defined by the accompanying claims.

The invention claimed is:

1. Mobility-assistive pants, comprising:
- an interior surface;
- a strap sheath carried by the interior surface and establishing a strap tunnel;
- a front pocket having an upper edge and a lower edge, and a strap opening proximate the lower edge of the front pocket; and
- a stretch-resistant strap movably extending through the strap sheath and into the front pocket through the strap opening, and being slidable in the strap tunnel relative to the strap sheath, wherein the stretch-resistant strap is composed of stretch-resistant nylon material, stretch-resistant polypropylene material, or stretch-resistant polyester material.

2. The mobility-assistive pants of claim 1, wherein:
- the interior surface is in an appendage tunnel of the mobility-assistive pants;
- the strap sheath extends along the appendage tunnel; and
- the stretch-resistant strap extends a distance greater than a length of the strap sheath and is slidable relative to the appendage tunnel and the strap sheath.

3. The mobility-assistive pants of claim 2, wherein the appendage tunnel also has a longitudinally extending seam, and wherein the strap sheath is sewn along the seam.

4. The mobility-assistive pants of claim 2, wherein the stretch-resistant strap extends between the strap sheath and the interior surface of the appendage tunnel.

5. The mobility-assistive pants of claim 2, wherein the strap sheath is a tubular component establishing the strap tunnel and the stretch-resistant strap extends through the strap sheath.

6. The mobility-assistive pants of claim 2, wherein the stretch-resistant strap has a distal end including a foot or handle.

7. The mobility-assistive pants of claim 6, wherein the foot or handle includes a strap fastener and the strap sheath includes a sheath fastener to fasten to the strap fastener.

8. The mobility-assistive pants of claim 2, wherein the stretch-resistant strap has a proximate end including a handle configured to be stored in the front pocket.

9. The mobility-assistive pants of claim 2, wherein the strap sheath extends along a majority of a length of the appendage tunnel.

10. Mobility-assistive pants, comprising:

a leg tunnel including an interior surface;

a strap sheath carried by the interior surface of the leg tunnel, extending along the leg tunnel, and establishing a strap tunnel; and a stretch-resistant strap extending through the strap tunnel of the strap sheath a distance greater than a length of the strap sheath, and slidable in the strap tunnel relative to the strap sheath and the leg, wherein the stretch-resistant strap is composed of stretch-resistant nylon material, stretch-resistant polypropylene material, or stretch-resistant polyester material, wherein the leg tunnel includes a front pocket, and wherein the stretch-resistant strap extends through an opening of the front pocket into an interior of the front pocket from which a handle of the stretch-resistant strap is retrievable and in which the handle of the stretch-resistant strap is storable.

11. Mobility-assistive pants, comprising:

a leg having a leg tunnel including an interior surface;

a strap sheath carried by the interior surface of the leg, extending longitudinally along the leg over a majority of a length of the leg, and establishing a strap tunnel; and a stretch-resistant strap extending through the strap tunnel of the strap sheath a distance greater than a length of the strap sheath, and slidable in the strap tunnel relative to the strap sheath and the leg, wherein the stretch-resistant strap is composed of stretch-resistant nylon material, stretch-resistant polypropylene material, or stretch-resistant polyester material, wherein the leg tunnel includes an opening in a middle one-third of the length of the leg tunnel, and wherein the stretch-resistant strap is extendible through the opening of the leg tunnel to form an intermediate handle.

12. The mobility-assistive pants of claim 11, wherein the opening is in a knee region of the leg tunnel.

13. Mobility-assistive pants, comprising:

a leg having a leg tunnel with an interior surface, a longitudinally extending seam, and a front pocket;

a strap sheath sewn along the seam of the leg, and extending along the leg tunnel over a majority of a length of the leg, and establishing a strap tunnel; and a strap extending through the strap sheath and through a side of the front pocket of the leg and into an interior of the front pocket of the leg, and extending a distance greater than the length of the strap sheath and being slidable in the strap tunnel relative to the leg and the strap sheath, and having a distal end including a foot coupling and a proximate end including a handle retrievable from the interior of the front pocket and storable in the interior of the front pocket.

14. The mobility-assistive pants of claim 13, wherein the strap is composed of a stretch-resistant nylon material, a stretch-resistant polypropylene material, or a stretch-resistant polyester material.

15. An upper body mobility-assistive garment, comprising:

an upper torso portion having a front torso portion and a rear torso portion;

a sleeve extending away from the upper torso portion establishing an arm tunnel and having an interior surface, a longitudinally extending seam, and a rear upper portion having an opening; a strap sheath sewn along the seam of the sleeve, and extending along the sleeve over a majority of a length of the sleeve, and establishing a strap tunnel; and a strap extending through the strap sheath and extending a distance greater than the length of the strap sheath and being slidable in the strap tunnel relative to the sleeve and the strap sheath, and having a distal end including a hand coupling and a proximate end including a handle extending through the opening of the rear upper portion of the sleeve.

16. The upper body mobility-assistive garment of claim 15, wherein the strap is composed of a stretch-resistant nylon material, a stretch-resistant polypropylene material, or a stretch-resistant polyester material.

17. An upper body mobility-assistive garment, comprising:

a torso portion having a front torso portion and a rear torso portion having an opening;

sleeves extending away from the torso portion and establishing arm tunnels;

a strap sheath being carried by the front and rear torso portions, crisscrossing over and under the sleeves, establishing a strap tunnel, and including spaced apart ends at the rear torso portion; and a strap extending through the strap sheath, being slidable in the strap tunnel relative to the strap sheath, and having underlying and overlying portions such that the strap crisscrosses in direct contact with the strap itself to establish a handle between the spaced apart ends of the strap sheath and accessible through the opening of the rear torso portion.

18. The upper body mobility-assistive garment of claim 17, wherein the strap is composed of a stretch-resistant nylon material, a stretch-resistant polypropylene material, or a stretch-resistant polyester material.

19. A method of repositioning an appendage of a wearer of a mobility-assistive garment, comprising:

coupling an appendage of the wearer to an appendage coupling of a slidable stretch-resistant strap of a mobility-assistive garment worn by the wearer, wherein the slidable stretch-resistant strap is composed of stretch-resistant nylon material, stretch-resistant polypropylene material, or stretch-resistant polyester material;

pulling on a handle of the slidable stretch-resistant strap of the mobility-assistive garment, so as to lift the wearer's appendage and slide the slidable stretch-resistant strap inside of a strap tunnel established by a sheath coupled to an interior surface of an appendage tunnel of the mobility-assistive garment and extending along the appendage tunnel;

swinging an appendage of the wearer of the mobility-assistive garment from a first position to a second position, while carrying out the pulling step; and releasing the slidable stretch-resistant strap once the appendage has been swung to the second position.

* * * * *